Jan. 25, 1966   R. D. POWELL   3,231,767
CIRCUIT SELECTION SWITCH
Filed July 18, 1962   2 Sheets-Sheet 2
FIG. 8.
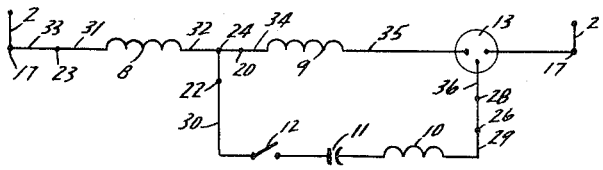
FIG. 9.
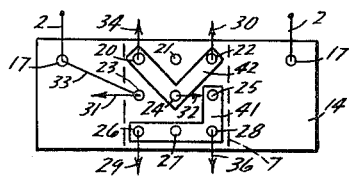
FIG. 10.
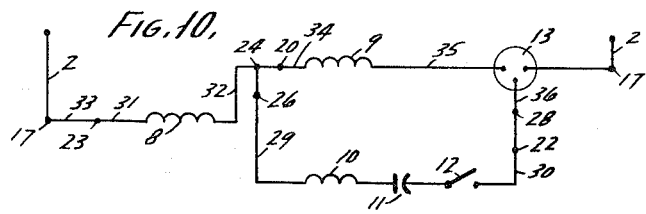
FIG. 11.
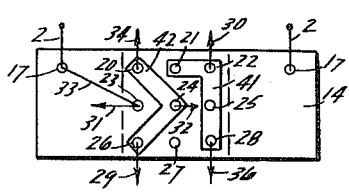
FIG. 12.
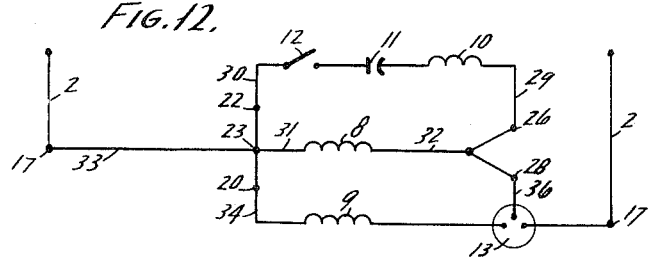
FIG. 13.
FIG. 14.
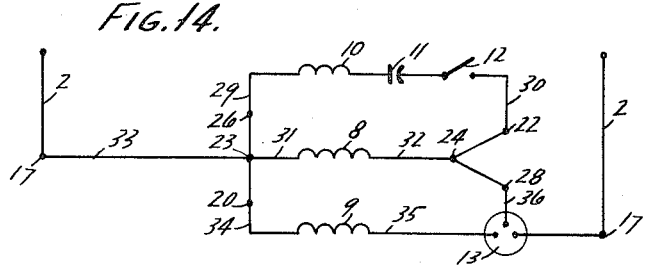
FIG. 15.
FIG. 16.
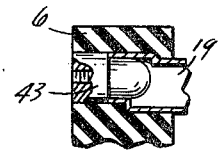
INVENTOR.
ROBERT D. POWELL
BY
ANDRUS & STARKE
ATTORNEYS.

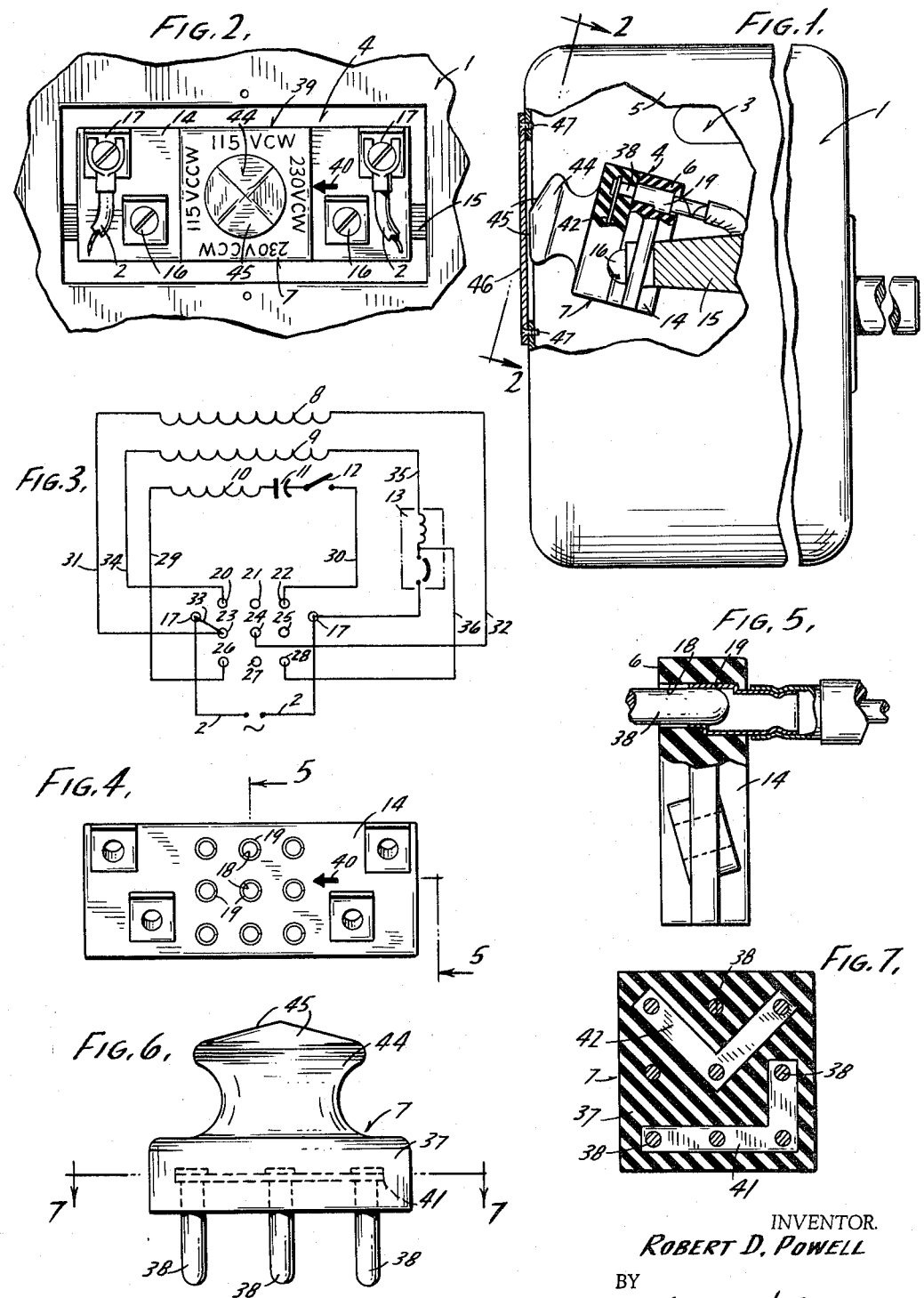

3,231,767
CIRCUIT SELECTION SWITCH
Robert D. Powell, Troy, Ohio, assignor to A. O. Smith Corporation, Milwaukee, Wis., a corporation of New York
Filed July 18, 1962, Ser. No. 210,727
4 Claims. (Cl. 310—71)

This invention relates to a circuit selection switch and particularly to a motor winding switch connector for establishing the operating voltage and the rotation of a single phase motor.

Generally, motors are manufactured for a specified voltage and directional rotation. Motors of the same variety are basically the same in physical construction with the voltage and the rotation being determined by the internal connection of the windings with respect to each other and to the incoming power leads. Motors which are mass produced and sold on request require the stocking of the various voltages and rotational means or final wiring just prior to shipment. Further, changing from one operating condition to another in the field has required the services of an experienced electrician who can trace the wiring system and change the internal wiring for the desired operating condition.

In order to overcome the above disadvantages and expense, plug and jack types of winding connecting boards have been proposed. However, they have been generally relatively expensive as well as cumbersome units which have not been particularly adapted to small single phase motors.

The present invention is particularly directed to a small plug and jack type connector which is adapted to be mounted within the frame of the usual motor and which allows simple determination of the voltage and rotation of a motor. The present invention is particularly directed to interconnection of a single phase motor having a starting winding and a pair of running windings.

In accordance with the present invention, the starting winding and the running windings and the incoming power leads are interconnected to a terminal panel or board having nine separate terminal members arranged in rows and columns of an evenly spaced square configuration. A connecting block or board is adapted to be releasably secured to the terminal board and includes seven terminal members located to engage selected ones of the nine terminal members for interconnecting the starting winding and the running windings to each other and to the incoming power leads. The connecting block is angularly located in different positions to align different terminal members and establishing operation for the various possible voltage and rotational directions. The terminal members of the connecting block are preferably arranged in an L-shaped group and a V-shaped group having the apex thereof located centrally of the L-shaped group.

In accordance with another aspect of the present invention, the connecting block may include an outer portion arranged to be engaged by an outer cover when the selection switch is mounted within the motor housing to thereby lock the connecting block in the assembled position. This prevents the connecting block from working free due to vibration and the like during operation of the motor.

The selection switch is located with the outer face of the connecting block preferably at a slight upward angle and circuit connection data is provided thereon for ease of viewing. The outer portion preferably then includes slanting external surfaces generally arranged with adjacent surfaces being mutually perpendicular. The cap or cover is secured to the motor frame and engages a different one of the slanting surfaces for each position of the connector to lock the connecting member in position.

The present invention provides a very small and compact unit of simple and low cost construction for interconnecting a single phase motor in a variety of voltage and rotational operations. A motor having the motor winding selection switch of the present invention can be changed from one operation to another by simply removing and turning the plug and thus does not require skilled or licensed workmen or the like.

The drawings furnished herewith illustrate the best mode presently contemplated for carrying out the invention.

In the drawings:

FIG. 1 is a fragmentary and side elevational view of a motor with parts broken away showing the construction of a motor winding selection switch in accordance with the present invention;

FIG. 2 is an end elevational view of a portion of FIG. 1 with parts broken away to show the selection switch;

FIG. 3 is a schematic circuit wiring diagram of a single phase motor;

FIG. 4 is an enlarged plan view of the motor mounted terminal board of the selection switch shown in FIGS. 1–3;

FIG. 5 is a view taken generally on broken lines 5—5 of FIG. 4;

FIG. 6 is an enlarged elevational view of the separable connecting board which cooperates with the motor mounted terminal board of FIG. 4;

FIG. 7 is a horizontal section taken on line 7—7 of FIG. 6;

FIG. 8 is a schematic circuit diagram for a 230 volt and clockwise rotation connection;

FIG. 9 is a diagrammatic illustration of the position of the selection switch components for the circuit of FIG. 8;

FIG. 10 is a view similar to FIG. 8 for a 230-volt and counterclockwise rotation connection;

FIG. 11 is a view similar to FIG. 9 of the relative positions of the selection switch components;

FIG. 12 is a schematic view similar to FIGS. 8 and 10 for 115 volt and a counterclockwise rotation connection;

FIG. 13 illustrates the relative positions of the selection switch components for establishing the circuit of FIG. 12;

FIG. 14 is the schematic circuit diagram for a 115 volt and clockwise rotation connection;

FIG. 15 illustrates the relative position of the selection switch components for establishing the circuit of FIG. 14; and FIG. 16 is a sectional view showing a dummy pin inserted in the motor mounted terminal board to prevent connection in a selected manner.

Referring to the drawings and particularly to FIGS. 1 and 2, a portion of a single phase alternating current electric motor 1 is shown. The electric motor 1 is constructed in a known manner for either operating on a voltage of 115 or 230 volts and for rotation in a clockwise or in a counterclockwise direction. Incoming power leads 2 with either 230 volts or 115 volts between them are interconnected with the motor windings 3 by a winding connection selection switch 4 for establishing the desired operating voltage and rotation. The selection switch 4 is constructed in accordance with the present invention as a small, compact unit and mounted within the outer housing or frame 5 of the motor 1.

Generally, selection switch 4 includes a terminal board or socket receptacle 6 fixedly mounted within the motor frame 5 and interconnected to the incoming power leads 2 and to the motor windings 3. A connecting board or removable plug 7 is releasably coupled to the receptacle 6 in any one of four perpendicularly related positions, each of which establishes a particular voltage and rotational circuit connection.

Referring particularly to FIG. 3, the windings 3 of motor 1 are schematically shown as including a pair of main running windings 8 and 9 and a phase or starting winding 10. The main running windings 8 and 9 are connected in series for 230-volt operation and in parallel for 115-volt operation. A capacitor 11 is connected in series with the starting winding 10 to create a conventional capacitor-start single phase motor. A centrifugal switch 12 is connected in a series circuit with starting winding 10 and capacitor 11 and opens the circuit after the motor 1 has reached a predetermined operation speed. After reaching this speed, the main running windings 8 and 9 maintain motor operation in accordance with known theory.

In the illustrated circuit, a thermostat 13 is mounted in heat exchange relation with windings 3 and is responsive to an excessive temperature rise to open the motor energizing circuit.

The proper interconnection of the main windings 8 and 9 to each other and to the starting winding 10 is determined by the incoming voltage of leads 2 and by the desired direction of rotation. In accordance with the present invention, the plug 7 is inserted in the receptacle 6 to directly establish any one of four desired combinations of voltage and rotational operation.

Referring particularly to FIGS. 2-5, the socket receptacle 6 includes a rectangular mounting base or plate 14 of plastic or other suitable insulating material. The mounting plate 14 is secured to suitable mounting walls 15 integrally formed with the motor frame 5 by bolts 16 which pass through aligned openings on opposite ends of the rectangular mounting plate 14 and threaded into suitably tapped openings in the walls 15. A pair of lead terminals 17 are provided one each on the opposite ends of the rectangular mounting plate 14 and the incoming power leads 2 are secured thereto. A plurality of socket openings 18 are provided in the rectangular mounting plate 14 and are arranged in a square configuration with three aligned vertical columns and three aligned horizontal rows. A tubular metal socket 19 is mounted within each of the openings 18 and winding leads from windings 8, 9 and 10 are electrically secured thereto in any suitable manner such as by crimping, soldering or the like.

Referring particularly to FIG. 3, the receptacle 6 is diagrammatically shown and the individual sockets are numbered 20 through 28 for clarity of explanation. Leads 29 and 30 connect the opposite ends of the series circuit including starting winding 10, capacitor 11 and switch 12 respectively to the upper right corner socket 22 and to the left lower corner socket 26. Leads 31 and 32 connect the main running winding 8 to the left center socket 23 and to the central most socket opening 24. A jumper lead 33 is connected to the left incoming power terminal 17 and to the left center socket 23 to interconnect the power terminal 17 directly to lead 31 of the main running winding 8. Leads 34 and 35 of the main running winding 9 are respectively connected to the left upper corner socket 20 and, through thermostat 13, to the right power terminal 17. A thermostat 36 is connected to the right lower corner socket 28 and to lead 35 within thermostat 13. The leads 29-35 are interconnected to each other and to the power leads 2 in accordance with a desired rotational direction and voltage by proper mounting of the plug 7 into receptacle 6.

Referring particularly to FIGS. 6 and 7, the plug 7 includes a rectangular plug body 37 corresponding in area to a configuration corresponding to seven of the plurality of socket openings 18 of receptacle 6. The plug body 37 formed of a suitable insulating material and carries seven connector pins 38 integrally embedded within the plug body 37. The connector pins 38 similarly project from the under surface of plug body 37 for selective insertion into the sockets 19 of the receptacle 6. As most clearly shown in FIG. 2, voltage and associated directional rotation indicia 39 is provided on the four sides of the rectangular body 37 and aligned with a molded arrow 40 provided on the receptacle 6. In FIG. 2, the motor connection is for a 230-volt and for clockwise rotation as in the upper edge of the rectangular body 37.

Referring particularly to FIGS. 6 and 7, four of the connector pins 38 extending along the lower edge and half of the adjacent right edge of the rectangular body 37 are connected by an L-shaped strap 41. A V-shaped strap 42 interconnects the remaining three connector pins 38 which are located respectively at the very center of the rectangular plug body 37 and in the left and right upper corners, as viewed in FIG. 7. The seven connector pins 38 are arranged and spaced in correspondence with the arrangement of the nine sockets 19 in the openings of receptacle 6 with pins in two locations being omitted. As viewed in FIG. 7, the connector pins 38 are omitted from the positions of the upper top center socket 21 and the left center socket opening 23 in FIG. 3.

Referring particularly to FIGS. 8-15, the four circuit connections provided by the four positions of the plug 7 which positions differ by a multiple of ninety degrees from each other are shown for the several permissible voltage and rotational connections with receptacle 6 wired in accordance with FIG. 3.

Referring particularly to FIG. 8 and 9, the 230-volt connection for clockwise rotation is illustrated. The plug 7 is inserted in receptacle 6 with the L-shaped group of pins 38 coupled by L-shaped strap 41 aligned with the bottom row of sockets 26-28 and the two lower sockets 25 and 28 of the right hand column of receptacle 6. The V-shaped strap 42 interconnects the upper left and right corner sockets 20 and 22 to the central socket 24 of receptacle 6.

The motor circuit of FIG. 3 is then connected to power leads 2 as shown in FIG. 8 and described as follows. The one incoming power lead 2 is connected by jumper lead 33 to the center socket 23 in the left column of sockets openings 18 and then by lead 31 to one side of main winding 8. The opposite side of the main winding 8 is connected by the lead 32 to the central socket 24 of the receptacle 6. Socket 24 is interconnected to the upper left and upper right sockets 20 and 22 by the connector pins 38 and V-shaped strap 42. The upper left socket 20 is connected by the lead 34 to one side of the main winding 9, the other side of which is connected through lead 35 and the thermostat 13 to the opposite terminal 17 and lead 2. Windings 8 and 9 are therefore connected in series between the incoming 230 volt power lines 2, as shown in FIG. 8.

As previously noted, the central most socket 24 is also interconnected to the upper right corner socket 22 by the V-shaped strap 42. The one side of the winding 9 is connected thereby to the socket 22 and then by lead 30 to the centrifugal switch 12, the capacitor 11 and the starting winding 10. From the winding 10, lead 29 is connected to the lower left corner socket 26 of the receptacle 6.

In the plug position of FIGS. 8 and 9, the L-shaped strap 41 is positioned with the long leg aligned with the lower row of receptacle sockets and the short leg aligned with two sockets in the right edge. The lower left corner socket 26 is thereby interconnected by the pins 38 and L-shaped strap 41 to the lower right socket 28 and consequently to the thermostat 13 and lead 36 which is connected to the terminal 17.

In this position of plug 7, the centrifugal switch 12, the capacitor 11 and the starting winding 10 are connected in parallel with running winding 9 and establishes an assumed clockwise rotation. The windings 8 and 9 are in series across the power lines 2 and thus the incoming power lines 2 must be 230 volts for proper motor operation.

Referring particularly to FIGS. 10 and 11, the pin and socket relationship and the circuit connection is shown for a 90° counterclockwise rotation of the plug 7 from the position shown in FIGS. 2 and 9. In accordance with the given indicia 39, the plug connection establishes a 230-volt and a counterclockwise rotation connection in which the main running windings 8 and 9 remain in the same connection as in FIG. 8 but the starting winding 10 is reversely connected to the running winding 9. The voltage connection therefore is the same but the current through the starting winding 10 is reversed. This results in the opposite or counterclockwise rotation of the motor 1, in accordance with well-known motor operation.

Similarly, the relative pin and socket relationships and the resulting circuit connections for a 115 volt, counterclockwise connection is shown in FIGS. 12 and 13 and for a 115 volt, clockwise connection shown in FIGS. 14 and 15.

As shown in FIGS. 12 and 14, the 115-volt connection places the running windings 8 and 9 in parallel. Clockwise rotation results in the circuit of FIG. 12 and counterclockwise rotation results in the circuit of FIG. 14 because of the reverse connection of starting winding 10.

The FIGS. 10–15 inclusive have been labeled with the appropriate numbers for the lead, sockets and the like and a specific tracing of the circuits of FIGS. 10, 12 and 14 are obvious in view of the previous description and no further explanation thereof is deemed necessary or desirable to a full and clear understanding of the present invention.

For each of these various connections, the plug 7 is inserted into the receptacle 6 with the corresponding indicia 29 aligned with the molded arrow 40.

Referring particularly to the diagrammatic illustration of the interconnection of the receptacle 6 in FIG. 3, the sockets 19 in socket openings 21, 25 and 27 are not connected to the motor windings 8, 9 or 10 and socket 23 is permanently connected to the one winding. Sockets 21, 23, 25 and 27 are centrally located in the four corresponding sides of the square configuration of the plurality of socket openings 18 and constitute code terminal members and, referring to FIGS. 9, 11, 13 and 15, in each position there is a free receptacle socket opening at least one of which is not occupied by a pin 38 and for each of the two possible voltage connections, one of these openings constitutes a common opening which is occupied by a pin 38. By insertion of a dummy pin 43 such as shown in FIG. 16, the corresponding pin 38 of plug 7 cannot enter the socket and prevents assembly of the plug 7 to effect the particular connection.

FIGS. 9 and 11 correspond to the 230-volt connections and FIGS. 13 and 15 correspond to the 115-volt connections. Whereas socket 25 is occupied in both FIGS. 9 and 11, the socket 25 is unoccupied in FIGS. 13 and 15. Thus, placement of a dummy pin 43 in socket 25 prevents the insertion of plug 7 in the manner necessary to produce the 230-volt connection and restricts the motor 1 to a 115-volt connection.

Similarly, socket 23 is occupied in FIGS. 13 and 15 and unoccupied in FIGS. 9 and 11. A dummy pin 43 in socket 23 thus prevents the 115 volt connection of FIGS. 13 and 15.

In the illustrated embodiment of the invention, FIGS. 9 and 15 correspond to the clockwise connection and FIGS. 11 and 13 correspond to the counterclockwise connection. Socket 27 is occupied in the clockwise connection and unoccupied in the counterclockwise connection.

Thus, a dummy pin 43 in the socket 27 prevents a clockwise connection while permitting a counterclockwise connection.

Similarly, socket 21 is occupied only in the counterclockwise connection and a dummy pin 43 therein prevents the corresponding connection.

If the connection is to be restricted to a single connection, dummy pins 43 would be appropriate placed in two of the sockets 21, 23, 25 and 27. For example, to restrict connection to that of FIG. 9, dummy pins 43 are placed in sockets 21 and 23 which are unoccupied therein but at least one of which is occupied in all other connections.

Referring particularly to FIGS. 1, 2 and 6, the plug 7 includes an outer projection or knob 44 by which the plug is readily inserted and removed from the receptacle 6. The outer end of the knob 44 is in the form of a pyramid having four flat surfaces 45 aligned respectively one each with the indicia 39 for the four electrical motor connections. The receptacle 6 is angularly mounted in correspondence with the angle of surfaces 45 such that when the plug 7 is inserted therein, the lower or bottom flat surface is in a vertical plane immediately adjacent the outer wall of the motor frame 5 as shown in FIG. 1. A small cover 46 is secured to the frame by suitable cap screws 47 and bears on the adjacent vertical surface 45 of the plug knob 44. Cover 46 positively locks the plug 7 in place such that motor vibration and the like cannot cause accidental removal of the plug 7 under motor operating conditions.

The present invention thus provides a very simple and versatile circuit connecting means particularly adapted for single phase motors having multiple running windings and a starting winding. The initial and subsequent connection of the motor requires a very minimum of skill and know-how.

A selector switch constructed in accordance with the present invention is a very small, compact unit which can be readily mounted within the standard commercial frame of small single phase motors.

Various modes of carrying out the invention are contemplated as being within the scope of the following claims particularly pointing out and distinctly claiming the subject matter which is regarded as the invention.

I claim:
1. A selection switch for a motor having a pair of running windings and a starting winding, comprising,
  (a) a terminal board having end mounting means,
  (b) a connecting member having releasably engageable terminal members of a pin and socket construction with similar terminal members secured respectively nine to the terminal board and seven to the connecting member and a pair of lead terminal members secured one each to the terminal board adjacent the mounting means,
  (c) the terminal members on said board being arranged in a square configuration by perpendicularly related rows of three terminal members located between said lead terminals,
  (d) the terminal members of said connecting member being arranged in an L-shaped group having three in a first leg and two in a second leg with one common to both legs and in a V-shaped group having a terminal member at each apex, said V-shaped group being arranged with respect to the L-shaped group to mate with the terminal members of the terminal board with the L-shaped group aligned with two sides thereof, and
  (e) means connecting the windings to the terminal members of the terminal board such that individual alignment of the first leg of the L-shaped group and each of the several sides of the square configuration of the socket member establishes a different and unique combination of voltage and rotational operation of the motor.

2. A switch constructed in accordance with claim 1 having,
(a) the terminal board provided with sockets as terminal members,
(b) the windings connected to the central and corner socket members and the intermediate side socket members constitute dummy sockets, and
(c) a dummy pin selectively positioned in said dummy socket members to prevent selected positioning of the plug with connection of the windings for the corresponding motor operation.

3. A connector constructed in accordance with claim 1 wherein,
(a) the starting winding is connected to opposite corner terminal members of the terminal board,
(b) the first main winding is connected to the other opposite corner terminal members of the terminal board,
(c) the second main winding is connected to the central terminal member and to an adjacent intermediate terminal member of the terminal board,
(d) one of the power leads is connected to said last-named intermediate terminal member and the second of the power leads is effectively connected to a corner terminal member in common with said first main winding,
(e) the intermediate terminal members in each side of the square configuration constituting dummy terminal members, and
(f) means releasably and selectively secured to said dummy terminal members to limit the winding connections.

4. A connector for a motor having a pair of running windings and a starting winding, comprising,
(a) a terminal board having spaced mounting means,
(b) a pair of lead terminals secured to the terminal board adjacent the mounting means,
(c) nine socket members arranged between said lead terminals in a square configuration of perpendicularly related columns and rows of three socket members each,
(d) a plug having seven projecting connector pins spaced in accordance with the spacing of said socket members and arranged in an L-shaped group of four pins with three pins in a first leg and two pins in the second leg with one of the pins being common to both legs and in a triangularly shaped group having a pin at each apex, said triangularly shaped group arranged with respect to the L-shaped group to mate with the socket members with the L-shaped group aligned with two sides thereof, and
(e) means connecting the windings to the socket members such that individual alignment of the first leg of the L-shaped group of pins and each of the several sides of the square configuration of the socket member establishes a different and unique combination of voltage and rotational operation for the motor.

References Cited by the Examiner

UNITED STATES PATENTS

| | | | |
|---|---|---|---|
| 2,922,054 | 1/1960 | Miller | 310—71 |
| 3,139,492 | 6/1964 | Cage | 339—31 |

ORIS L. RADER, *Primary Examiner.*